United States Patent [19]

Matsushita et al.

[11] 4,159,245

[45] Jun. 26, 1979

[54] METHOD FOR REMOVAL OF FOGGING COMPONENTS IN PHOTOGRAPHIC PROCESSING SOLUTION

[75] Inventors: Sachio Matsushita; Isao Shimamura; Hiroyuki Hirai; Kazuo Shirasu, all of Minami-ashigara, Japan

[73] Assignee: Fuji Photo Film Co., Ltd., Minami-ashigara, Japan

[21] Appl. No.: 823,799

[22] Filed: Aug. 11, 1977

[30] Foreign Application Priority Data

Aug. 11, 1976 [JP] Japan .................................. 51-96340

[51] Int. Cl.² ......................... B01D 13/00; G03C 7/00
[52] U.S. Cl. ................................. 210/22 R; 210/23 R; 210/321 R; 210/500 M; 96/56
[58] Field of Search ..................... 210/21, 22 R, 22 C, 210/23, 96 M, 321, 433 M, 500 M, 511; 96/48 R, 50 A, 50 R, 56, 60 R, 63; 264/127

[56] References Cited

U.S. PATENT DOCUMENTS 3,769,206  10/1973  Brown et al. ........................ 210/22

FOREIGN PATENT DOCUMENTS 709179  5/1954  United Kingdom.

*Primary Examiner*—Ferris H. Lander
*Attorney, Agent, or Firm*—Sughrue, Rothwell, Mion, Zinn and Macpeak

[57] ABSTRACT

A method for removing fogging and/or color mixing components formed in a color developer containing an aromatic primary amine developing agent during the development processing using the color developer which comprises contacting the color developer with an aqueous solution through a continuous fine open-cell porous diaphragm of a hydrophobic material to thereby transfer the fogging and/or color mixing components from the color developer to the aqueous solution.

11 Claims, No Drawings

METHOD FOR REMOVAL OF FOGGING COMPONENTS IN PHOTOGRAPHIC PROCESSING SOLUTION

BACKGROUND OF THE INVENTION

1. Field of the Invention

The present invention relates to a color photographic processing method. More particularly the present invention is concerned with a method for removing a fogging material formed in a color developer with the lapse of time or formed therein by regeneration of the color developer by passing the fogging material through a hydrophobic porous diaphragm.

2. Description of the Prior Art

Aromatic primary amines, especially p-phenylenediamine derivatives are generally used as developing agents for use in color developers. Representative examples of these aromatic primary amines are N,N-diethyl-p-phenylenediamine, 4-diethylamino-2-methylaniline, 2-methyl-4-[N-ethyl-N-($\beta$-hydroxyethyl)amino]aniline, 2-methyl-4-[N-ethyl-N-($\beta$-hydroxyethyl)amino]aniline and the like.

Color developers containing these aromatic primary amines as developing agents cannot contain a large amount of sulfites as preservatives (antioxidants), which is different from the situation with black-white developers containing N-alkyl-p-aminophenols or hydroquinones as developing agents, because a large amount of sulfites inhibits the coloring reaction between the aromatic primary amine developing agents and color couplers. Therefore, in a color developer containing an aromatic primary amine as a developing agent, hydroxylamine is generally used in combination with a sulfite as an antioxidant. However, since the decomposition of hydroxylamine is markedly accelerated owing to the presence of iron ions and copper ions, it is essential for a color developer containing hydroxylamine as a preservative to contain therein masking agents for heavy metal ions.

Aminopolycarboxylic acids such as nitrilotriacetic acid, ethylenediamine tetraacetic acid and the like are known as masking agents for heavy metal ions. They have, however, defects in that they themselves or the chelates thereof with heavy metal ions accelerate the decomposition of hydroxylamine. While 1,3-diamino-2-propanol tetraacetic acid described in U.S. Pat. No. 2,875,049 and diethylenetriamine tetraacetic acid described in U.S. Pat. No. 3,462,269 decompose hydroxylamine to a relatively lesser extent, they are not satisfactory. When a developer is allowed to stand for a long period of time or running (the term "running" herein used means continuous developing processing) is continued, the hydroxylamine contained in the developer decomposes, causing fogging and/or color mixing in a light-sensitive element after developing processing. Several materials have been reported to cause fogging or color mixing [see, for example, P. J. Mutter, *Phot. Sci. Eng.*, 849 (1964)], but this, however, is a matter of conjecture.

A wide variety of photographic processing solutions are used to develop a silver halide photographic light-sensitive material exposed to light. A photographic processing solution having the most suitable composition is selected depending on the kind of silver halide photographic light-sensitive material to be processed. This developing solution exhibits the most desired developing capability under the conditions where the concentration of each component contained therein is maintained within a specific range. During the developing processing of a light-sensitive material, however, some of the components contained in the developer are consumed, whereas the concentration of other components increases due to components leaching out of the photographic light-sensitive material. In this way, the composition of the developer gradually changes, resulting in a decrease in development capability.

In order to enable a photographic processing solution to be used repeatedly by restoring the reduced processing capability thereof, a supplemental solution is generally added to the fatigued photographic processing solution after processing a predetermined number of photographic light-sensitive materials. This method of adding a supplemental solution can be used to supply the components consumed, but fails to reduce the components whose concentration has increased.

In general, when a supplemental solution is added, a photographic processing solution to be regenerated is withdrawn in the same amount as that of the supplemental solution added, for example, by overflowing, so that the amount of the processing solution in the processing vessel is kept constant. This withdrawal of the processing solution can be used to somewhat decrease the concentration of undesired components whose concentration has increased. Reduction of the concentration of the undesired components to the desired level requires the withdrawal of a large amount of the processing solution, however.

With regard to a developer, the halogen ion concentration contained therein increases as the developing processing is carried out. Of the halogen ions, bromine ion, has a great influence on the processing capability of a processing solution; that is, an increase in bromine ion concentration in the developer markedly decreases the rate of development. On the other hand, the chlorine ion concentration also increases, but an increase in chlorine ion concentration has substantially no adverse influence on the processing capability of the developer. As a result, the influence of the bromine ion concentration on the developer is great and is taken seriously.

In an automatic developing machine for processing a large number of photographic light-sensitive materials continuously and rapidly, it is necessary for the developing processing to always be stable and the processing capability is kept constant so that the same photographic characteristics are always obtained. Thus the processing capability of a developer, whose developing capability is decreased due to the developing processing of photographic light-sensitive materials, is restored by adding a supplemental solution to the developer. It is, however, quite difficult to control the increase in bromine ion concentration, which significantly influences the developer, even though a part of the developer is withdrawn by overflowing, for example. Therefore, to restore the processing capability of a developer for re-use, the components consumed during the development must be supplemented and, at the same time, the concentration of bromine ion adversely influencing the developing effect must be decreased to below a certain level.

As can be understood from the above explanation, it is necessary for not only the components consumed during the development and necessary for the development to be supplemented, but also the bromine ion, which increases in concentration during the development and adversely influences the developing effect, to be removed.

Thus a method of removing bromine ion from the fatigued developing solution by the use of an ion exchange resin (e.g., as disclosed in *Journal of the SMPTE*, Vol. 65, 478 to 484; Vol. 66, 64 to 65), a method of removing bromine ion by electrodialysis using an ion exchange film (e.g., as disclosed in *Bulletin of the Society of Scientific Photography of Japan*, No. 18, December (1968), pp. 38 to 44), a method of removing bromine ion by electrolysis, etc., are known.

In accordance with the method of removing halogen ions by electrolysis, a fatigued developer is introduced into a cathodic cell of an electrolytic cell in which the cathodic and anodic cells are formed by placing an anion exchange film between a cathode and an anode, and an electrolyte is introduced into the anodic cell, and then an electric current is passed between the electrodes to effect electrolysis, thus removing halogen ions.

While the above described methods can be used to effectively remove the halogen ions, other components present in the developer are decomposed during regeneration such as by electrolysis, etc., due to an electrochemical action. As a result, those components causing fogging and/or color mixing in a photographic image are formed. These fogging and/or color mixing components are formed to a great extent when the color developer contains hydroxylamine. Therefore, when a processing solution which has been used for a long period of time and is fatigued, and which already contains fogging components, is regenerated, the concentration of the fogging components increases. In regeneration using an ion exchange resin, the developer components are rarely decomposed during regeneration. However, those components decomposing gradually accumulate in a large amount by repeated regeneration processing, thereby causing fogging and/or color mixing in a photographic image.

As described above, with color developers, particularly those color developers containing hydroxyamines, the removal of fogging and/or color mixing components, which are formed by allowing the developer to stand for a long period of time after incorporation of heavy metal ions or by running the developer, or which are formed by regeneration of the developer such as ion exchange, electrolysis, electrodialysis, or the like, is essential for obtaining a high quality image.

SUMMARY OF THE INVENTION

An object of the present invention is to provide a method for removing fogging or color mixing components from a color developer, particularly a color developer which contains hydroxylamine and in which heavy metal ions are present.

Another object of the present invention is to provide a method for removing fogging or color mixing components from a regenerated color developer, particularly a color developer containing hydroxylamine which is regenerated using methods such as ion exchange, electrolysis, electrodialysis or like methods.

A further object of the present invention is to provide a method for increasing the stability of color development and for obtaining a high quality image free of fogging or color mixing.

Further another object of the present invention is provide a regeneration processing system for a color developer.

These objects are attained by the method of this invention comprising contacting a color developer, which has been used for a long period of time and subjected to regeneration, with an aqueous solution through a continuous fine open-cell porous diaphragm of a hydrophobic material to transfer those components causing fogging and/or color mixing through the diaphragm into the aqueous solution.

The method of the present invention enables removal of fogging and/or color mixing components without any adverse influences on the color developer from arising.

DETAILED DESCRIPTION OF THE INVENTION

Continuous fine open-cell porous diaphragms which can be used in the present invention are made of pure polytetrafluoroethylene or mixtures of polytetrafluoroethylene and polyethylene, polypropylene, polyvinyl chloride or the like. The polytetrafluoroethylene content is higher than about 50%, preferably not less than 70%. A suitable average pore size (ASTM method) is aboug 0.1 to about 100 microns, preferably 0.2 to 50 microns, more preferably 0.5 to 10 microns. A suitable thickness of the diaphragm is about 0.01 to about 5 mm, preferably 0.1 to 2 mm. These continuous fine open-cell porous diaphragms of hydrophobic materials are described in Japanese Patent Application (OPI) No. 7284/1971, Japanese Patent Publication Nos. 13560/1967, 41265/1974, U.S. Pat. Nos. 3,315,020, 3,664,915, etc.

The continuous fine open-cell porous diaphragm is used in the form of a film or a tube. A suitable diameter for the continuous fine open-cell porous diaphragm when used in the form of a tube is about 0.1 mm to about 10 cm, preferably 1 to 10 mm.

In addition, those continuous fine open-cell porous diaphragms made of hydrophobic materials other than the above described materials but having the same capability can also be used in the present invention.

In accordance with the method of the present invention, one side of a continuous fine open-cell porous diaphragm of a hydrophobic material is brought in contact with a color developer and the other side thereof is brought in contact with an aqueous solution to thereby transfer the fogging and/or color mixing components present in the color developer to the aqueous solution. Aqueous solutions which can be used are water alone, water plus organic solvents miscible with water and aqueous solutions containing an acid or an acid salt. Preferred aqueous solutions which can be used to absorb the fogging and/or color mixing components include those aqueous solutions containing acids and/or acid salts.

Suitable examples of acids which can be used in the present invention are inorganic acids such as hydrochloric acid, nitric acid, sulfuric acid, phosphoric acid, boric acid and the like; organic acids such as acetic acid, propionic acid, maleic acid, citric acid, oxalic acid, malic acid, toluenesulfonic acid and the like.

Suitable examples of the salts which can be used in the present invention are the alkali metal salts or ammonium salts of the above described acids, such as sodium chloride, sodium sulfate, sodium phosphate, sodium borate, sodium acetate and the like, or carbonates such as sodium hydrogencarbonate, etc.

A suitable concentration of the acid or salt is about 0.001 to about 10 mole/l, preferably 0.01 to 5 mole/l.

A suitable pH of the aqueous acid or salt solution is not more than about 10, e.g., not less than about 1 to not more than about 10, preferably not more than 9 and more preferably not more than 8.

As described above the aqueous solutions which can be used in this invention can contain, if desired, water-soluble organic solvents such as alcohols such as methyl alcohol, propyl alcohol, etc. The amount of the organic solvent which can be employed is not more than about 10%, preferably not more than 3%, by volume.

The time of treatment in the process of this invention will depend on factors such as the level of fogging components present in the used color developer, the rate of contact of the aqueous solution with the fine open-cell porous diaphragm in contact with the used color developer and the like. As a result a suitable treatment time cannot be set forth unequivocally. However, as an example, when the process of the present invention is employed on a used color developer and a fine open-cell porous diaphragm in the form of a tube (tube diameter: 3.6 mm; length: 3 mm; thickness: 0.5 mm; maximum pore diameter:2.5 $\mu$; porosity: 70%; density: 0.6 g/cm$^3$) is employed and inserted in 1 l of used color developer and a 0.5 M phosphoric acid solution is passed through the tube at a flow rate of 100 ml/min., 3 hours of treatment with a fogging optical density of 0.1 is needed to decrease the fogging optical density to a value which is acceptable for practical use.

Japanese Patent Application No. 44780/75 discloses a technique for removing fogging components from an intensifier solution using a porous open-cell diaphragm. However, since an intensifier solution is quite different from a color developer solution, it was unexpected that fogging components could be removed from a color developer solution as in this invention.

Color developing agents which can be used in the developer to which the present invention is applicable include p-phenylenediamine derivative color developing agents. Preferred examples of these p-phenylenediamine derivative color developing agents are N,N-diethyl-p-phenylenediamine hydrochloride, 2-amino-5-diethylaminotoluene hydrochloride, 2-amino-5-(N-ethyl-laurylamino)toluene chloride, 4-[N-ethyl-N-($\beta$-hydroxyethyl)amino]aniline sulfate, 2-methyl-4-[N-ethyl-N-($\beta$-hydroxyethyl)amino]aniline sulfate, N-ethyl-N-($\beta$-methanesulfonamidoethyl)-3-methyl-4-aminoaniline sesquisulfate monohydrate described in U.S. Pat. No. 2,193,015, N-(2-amino-5-diethylaminophenylethyl)methanesulfonamide sulfate described in U.S. Pat. No. 2,592,364, N,N-dimethyl-p-phenylenediamine hydrochloride, 4-amino-3-methyl-N-ethyl-N-methoxyethylaniline, 4-amino-3-methyl-N-ethyl-N-$\beta$-ethoxyethylaniline and 4-amino-3-methyl-N-ethyl-N-$\beta$-butoxyethylaniline, and the salts thereof (e.g., the sulfates, hydrochlorides, sulfites, p-toluenesulfonates, etc.) described in U.S. Pat. Nos. 3,656,950, 3,698,525, and the like. A suitable amount of the developing agent present in the developer can range from about $1\times10^{-3}$ to $1\times10^{-1}$ mol/l.

In addition, those compounds described in *Kagaku Shashin Binran* (*Handbook of Scientific Photography*), Vol. 2, page 72, Maruzen, Tokyo (1959), and L. F. A. Mason, *Photographic Processing Chemistry*, pp. 226 to 229, Focal Press, London (1966) can be used.

The developer solution can further contain other known developer components. For example, as alkali agents, buffer agents and the like, sodium hydroxide, potassium hydroxide, sodium carbonate, potassium carbonate, sodium or potassium phosphate, potassium metaborate, borax and the like can be used individually or in combination with each other. In addition, for the purposes of providing buffering capability, compounding or increasing the ionic strength, sodium or potassium hydrogen-phosphate, potassium or sodium dihydrogenphosphate, sodium or potassium hydrogencarbonate, boric acid, alkali metal nitrates, alkali metal sulfates, and various other salts can be used.

Development accelerating agents can be, if desired, added to the developer solution. Representative examples of these development accelerating agents are pyridinium compounds, other cationic compounds, cationic dye such as safranine, neutral salts such as thallium nitrate and potassium nitrate as described in U.S. Pat. No. 2,648,604, Japanese Patent Publication No. 9503/1969, U.S. Pat. No. 3,671,247; polyethyleneglycol and the derivatives thereof, polythioethers, and other nonionic compounds as described in Japanese Patent Publication No. 9504/1969, U.S. Pat. Nos. 2,533,990, 2,531,832, 2,950,970, 2,577,127; organic solvents as described in Japanese Patent Publication No. 9509/1969, Belgian Pat. No. 682,862; organic amines, ethanolamine, ethylenediamine, diethanolamine and the like.

In addition, those accelerating agents described in L. F. A. Mason, *Photographic Processing Chemistry*, pp. 40 to 43, Focal Press, London (1966), can be used.

Also, benzyl alcohol and phenylethyl alcohol described in U.S. Pat. No. 2,515,147, pyridines, ammonia, hydrazine, amines described in *Nippon Shashin Gakkai Shi* (*Journal of Japanese Photographic Association*), Japan, Vol. 14, page 74 (1952), and the like are effective development accelerating agents.

Furthermore, hydroxylamine sulfate and hydrochloride, sodium sulfite, potassium sulfite, potassium hydrosulfate, or sodium hydrosulfate can be added to the developer.

Any anti-fogging agents can be added. Examples of these anti-fogging agents include alkali metal halides such as potassium bromide, sodium bromide, potassium iodide, and organic anti-fogging agents. Representative examples of organic anti-fogging agents are nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, mercapto substituted heterocyclic compounds such as 1-phenyl-5-mercaptotetrazole, 2-mercaptobenzimidazole, 2-mercaptobenzothiazole, mercapto substituted aromatic compounds such as thiosalicylic acid, and the like. Preferred compounds are nitrogen-containing heterocyclic compounds and mercapto unsubstituted nitrogen-containing heterocyclic compounds are particularly preferred.

A suitable amount of the anti-fogging agent which can be employed is about 1 mg to about 5 g, preferably 5 mg to 1 g, per liter of a processing solution.

In addition, a water softener can be employed in the developer. Suitable examples of these water softeners are polyphosphate compounds such as sodium hexametaphosphate, sodium tetrapolyphosphate, sodium tripolyphosphate, potassium hexametaphosphate, potassium tetrapolyphosphate and potassium tripolyphosphate; aminopolycarboxylic acids such as ethylenediamine tetraacetic acid, nitrilotriacetic acid, cyclohexanediamine tetraacetic acid, iminodiacetic acid, N-hydroxymethylethylenediamine triacetic acid, diethylenetriamine pentaacetic acid, 1,3-diaminopropanol tetraacetic acid, triethylenetetraamine hexaacetic acid, glycol ether diamine tetraacetic acid, and the like.

The amount of the water softener which can be employed is generally about 0.5 to about 1 g/l of the developer.

Furthermore, a potassium or magnesium masking agent can be added to the processing solution. These masking agents are described in J. Willems, *Belgisches Chemisches Industry*, Vol. 21, page 325 (1956) and Vol. 23, page 1105 (1958). In addition, organic phosphonic acid compounds as described in West Germany Patent Application (OLS) No. 2,227,139 can be employed.

Color couplers which can be employed in the developer solution to which the method of this invention is applicable are those compounds which form dyes on reacting with oxidized color developing agents. Representative examples of these color couplers are used in conventional color photographic light-sensitive materials, etc., such as open chain keto-methylene type couplers, 5-pyrazolone type couplers, indazolone type couplers and phenol or naphthol type couplers; diffusible dye releasing (DDR) couplers, which release diffusible dyes on reacting with color developing agents, as described in British Pat. No. 840,731, U.S. Pat. No. 3,227,550, Japanese Patent Application (OPI) No. 123022/1975, etc.; amidrazone compounds, which release diffusible dyes on reacting with the oxidized products of color developing agents, as described in Japanese Patent Publication No. 39165/1973, etc., and the like.

The following description is given relative to typical color light-sensitive photographic materials which can be developed with a color developer to which the method of this invention is applicable.

A so-called coupler is incorporated into a light-sensitive material and the amount of the coupler is that amount which will provide a sufficient color density. Thus the coupler is added in an amount equimolar to or more than the silver generally present. Any known couplers can be employed.

A compound forming a dye on reacting with an oxidized color developing agent, i.e., a so-called color coupler is incorporated in a light-sensitive photographic emulsion layer used as a color photographic light-sensitive material. Such a color coupler has such a structure which renders it non-diffusible into another layer during production or processing thereof.

Examples of color couplers which can be used in the light-sensitive color photographic material are as follows.

Open chain keto-methylene type compounds which are described in U.S. Pat. Nos. 3,341,331, 2,875,057, 3,551,155, West German Patent Application (OLS) No. 1,547,868, U.S. Pat. Nos. 3,265,506, 3,582,322, 3,725,072, West German Patent Application (OLS) No. 2,162,899, U.S. Pat. Nos. 3,369,895, 3,408,194, West German Patent Application (OLS) Nos. 2,057,941, 2,213,461, 2,219,917, 2,261,361, 2,263,875, etc. can be used as yellow couplers.

5-Pyrazolone type compounds are generally used as magenta couplers and in addition, indazolone based compounds and cyanoacetyl compounds can also be used as magenta couplers. Suitable examples of these compounds are described in U.S. Pat. Nos. 2,439,098, 2,600,788, 3,062,653, 3,558,319, British Pat. No. 956,261, U.S. Pat. Nos. 3,582,322, 3,615,506, 3,519,429, 3,311,476, 3,419,391, Japanese Patent Application Nos. 21454/1973, 56050/1973, German Pat. (ALS) No. 1,810,464, Japanese Patent Publication No. 2016/1969, Japanese Patent Application No. 45971/1973, U.S. Pat. No. 2,983,608, etc.

Phenol or naphthol derivatives are generally used as cyan couplers. Suitable examples of these compounds are described in U.S. Pat. Nos. 2,369,929, 2,474,293, 2,698,794, 2,895,826, 3,311,476, 3,458,315, 3,560,212, 3,582,322, 3,591,383, 3,386,301, 2,434,272, 2,706,684, 3,034,892, 3,583,971, West German Patent Application (OLS) No. 2,163,811, Japanese Patent Publication No. 28836/1970, Japanese Patent Application No. 33238/1973, etc.

Development inhibitor releasing type couplers (the so-called DIR couplers) on color reaction, and those compounds releasing development inhibitors on color reaction can also be employed. These compounds are described in U.S. Pat. Nos. 3,148,062, 3,227,554, 3,253,924, 3,617,291, 3,622,328, 3,705,201, British Pat. No. 1,201,110, U.S. Pat. Nos. 3,297,445, 3,379,529, 3,639,417, etc.

Two or more of these couplers can be incorporated into the same layer to achieve the characteristics required for a light-sensitive material, and also the same compound can be incorporated in two or more different layers, if desired.

Color couplers to be incorporated into a unit layer of the light-sensitive material are color couplers insoluble in water mixed with a color coupler solvent (preferably, a color coupler solvent having a suitable polarity). Useful, typical examples of these solvents are tri-o-cresylphosphate, trihexylphosphate, dioctylbutylphosphate, di-butylphthalate, diethyllaurylamide, 2,4-diallylphenol, liquid dye stabilizers as described in *Product Liscensing Index*, Vol, 83, pp 26 to 29 (March, 1971), under the designation "improved type of photographic dye image stabilizing solvents", and the like.

It is preferred for the maximum absorption wavelength range of a cyan dye formed from a cyan color coupler to be between about 600 and about 720 nm; the maximum absorption wavelength range of a magenta dye formed from a magenta color coupler to be between about 500 and about 580 nm; and the maximum absorption wavelength range of a yellow dye formed from a yellow coupler to be between about 400 and about 480 nm.

To a color developer to which the present invention is applicable can be, if desired, added those compounds as described hereinafter in addition to the above described compounds. For example, competing couplers such as citrazinic acid, J acid or H acid can be added to a color developer. Specific examples of these competing couplers are described in Japanese Patent Publication Nos. 9505/1969, 9506/1969, 9507/1969, 14039/1969, 9508/1969, U.S. Pat. Nos. 2,742,832, 3,520,690, 3,560,212, 3,645,737, etc.

Examples of fogging agents which can be used in the developer include alkali metal borohydrides, amine boranes, ethylenediamine, those compounds as described in Japanese Patent Publication No. 38816/1972, etc.

The silver halide emulsions used in a light-sensitive color photographic material are generally prepared by mixing a water-soluble silver salt (e.g., silver nitrate) solution and a water-soluble halide (e.g., potassium bromide) solution in the presence of a water-soluble polymer (e.g., gelatin) solution. In addition to silver chloride and silver bromide, mixed silver halides such as silver chlorobromide, silver iodobormide, silver chloroiodobromide and the like can be used as the silver halide.

The forms of the grains of these silver halides can be any form such as that of the cubic system, the octahedral system, a mixed crystal system thereof, and the like.

Further, two or more silver halide photographic emulsions prepared separately can be mixed. The crystal structure of the silver halide grains can be either one in which the structure is uniform throughout, or a layer structure in which the inner part and outer part are different from each other, or of the so-called conversion type as described in British Pat. No. 635,841, U.S. Pat. No. 3,622,318. In addition, the grains can be either of the type in which a latent image is mainly formed on the surface thereof, or of the type in which a latent image is formed in the inner part of the grains.

These photographic emulsions can be prepared by the ammonia process, the neutral process, the acid process, etc., as described in C. E. K. Mees & T. H. James, *The Theory of the Photographic Process*, 3rd Ed., MacMillan, New York (1967); P. Grafkides, *Chimie Photographique*, Paul Montel, Paris, (1957), etc.

The above described silver halide emulsions can be chemically sensitized using conventional methods.

Chemical sensitizing agents which can be used in the light-sensitive color photographic material include gold compounds such as chloroauric acid salts, gold trichloride and the like, as described in U.S. Pat. Nos. 2,399,083, 2,540,085, 2,597,856, 2,597,915; salts of noble metals such as platinum, palladium, iridium, rhodium, ruthenium, as described in U.S. Pat. Nos. 2,448,060, 2,540,086, 2,566,245, 2,566,263, 2,598,079; sulfur compounds forming silver sulfide on reacting with silver salts, as described in U.S. Pat. Nos. 1,574,944, 2,410,689, 3,189,458, 3,501,313; reducing compounds such as stannous salts, amines and the like, as described in U.S. Pat. Nos. 2,487,850, 2,518,698, 2,521,925, 2,521,926, 2,694,637, 2,983,610, 3,201,254; etc.

In some cases, it is preferred for various additional additives to be incorporated in a photographic element so as to obtain the desired development characteristics, image characteristics, film properties, etc. For example, iodides or organic compounds containing a free mercapto group, such as phenyl mercaptotetrazole, alkali metal iodides, and the like can be added to the photographic element. In addition, hardening agents, lubricants, plasticizers, surface active agents, brightening agents and other additives known in the photographic art can be employed.

Hydrophilic colloids which are used in the color-photographic light-sensitive material include proteins such as gelatin, colloidal albumin, casein, and the like, cellulose derivatives such as carboxymethyl cellulose, hydroxyethyl cellulose and the like; saccharide derivatives such as agar, sodium alginate, starch derivatives and the like; synthetic hydrophilic colloids such as polyvinyl alcohol, poly N-vinylpyrrolidone, polyacrylic acid copolymers, polyacrylamide or the derivatives or partially hydrolyzed products thereof; etc. If desired, mutually compatible mixtures comprising two or more of the above hydrophilic colloids can be used. Of the above described colloids, gelatin is most usually employed. A part or all of the gelatin can be replaced by a synthetic hydrophilic colloid, or the so-called gelatin derivatives can be used.

The photographic emulsion can be, if desired, spectrally sensitized or supersensitized by the use of cyanine dyes such as cyanine, meracyanine, carbocyanine and the like, individually or in combination with each other, or by the use thereof in combination with styryl dyes and the like. These color sensitizing techniques are well known and are described in U.S. Pat. Nos. 2,493,748, 2,519,001, 2,977,229, 3,480,434, 3,672,897, 3,703,377, 2,688,545, 2,912,329, 3,397,060, 3,615,635, 3,628,964, British Pat. Nos. 1,195,302, 1,242,588, 1,293,862, West German Patent Application (OLS) Nos. 2,030,326, 2,121,780, Japanese Patent Publication Nos. 4936/1968, 14030/1969, 10773/1968, U.S. Pat. Nos. 3,511,644, 3,522,052, 3,527,641, 2,615,613, 3,615,632, 3,617,295, 3,635,721, 3,694,217, British Pat. Nos. 1,137,580, 1,216,203, etc.

These sensitizing techniques are selected depending on the wavelength range to be sensitized, sensitivity desired, etc., i.e., the object and use of the light-sensitive material.

The photographic element contains at least one silver halide emulsion layer on a support. In general, the photographic material contains a red-sensitive silver halide emulsion layer, a green-sensitive silver halide emulsion layer and a blue-sensitive silver halide emulsion layer on a support. Alternatively, a red-sensitive silver halide emulsion layer containing a cyan image forming coupler, a green-sensitive silver halide emulsion layer containing a magenta image forming coupler and a blue-sensitive silver halide emulsion layer containing an yellow image forming coupler on a support can be used. Such a photographic element further includes light insensitive photographic layers such as an anti-halation layer, an intermediate layer to prevent mixing, etc., a yellow filter layer, a protective layer, etc.

The red-sensitive layer, the green-sensitive layer and the blue-sensitive layer can be provided in any order on the support, for example, in the order of the red-sensitive layer, the green-sensitive layer and the blue-sensitive layer, or the blue-sensitive layer, the red-sensitive layer and the green-sensitive layer, or the red-sensitive layer, the green-sensitive layer and the blue-sensitive layer, or the like.

In the photographic element, one emulsion layer can contain a plurality of unit emulsion layers, and can comprise various layers, as described in U.S. Pat. No. 3,726,681, British Pat. Nos. 818,687, 923,045, U.S. Pat. No. 3,516,831, Japanese Patent Application Nos. 5179/1975, 42541/1975, etc.

Photographic supports which can be used for the color photographic light-sensitive material include a cellulose nitrate film, a cellulose acetate film, a cellulose acetate butyrate film, a cellulose acetate propionate film, a polystyrene film, a polyethylene terephthalate film, a polycarbonate film and laminates thereof, a thin glass film, paper, etc., which are generally used in photographic light-sensitive materials. In addition, those supports on which baryta or a polymer of an $\alpha$-olefin (having 2 to 10 carbon atoms) such as polyethylene, polypropylene, ethylene-butene copolymers and the like has been coated or laminated on a paper, whose synthetic resin films whose surface has been roughened to improve the adhesion property with gelatin, modified gelatin, etc., as described in Japanese Patent Publication No. 19068/1972, etc. can be used with good results.

These supports may be transparent or opaque depending upon the end use of the light-sensitive material. In the case of a transparent support, they may be either colorless or colored by adding dyes or pigments, as employed in X-ray films and as described in *J. SMPTE*, 67, 296 (1958), etc.

Opaque supports include those supports such as paper which are intrinsically opaque or prepared by adding dyes or pigments such as titanium oxide to transparent synthetic resin films; synthetic resin films whose surface has been processed by the method as described in Japanese Patent Publication No. 19068/1972; those papers and synthetic resin films completely rendered light-intercepting by addition of carbon black, dyes and the like; etc.

A layer having adhesion properties to both the support and a photographic layer is usually provided as a subbing layer. Furthermore, in order to improve the adhesion properties, the surface of the support can be subjected to pre-treatments such as corona discharging, irradiation with ultraviolet light, flame processing, etc.

Those compounds as described in Japanese Patent Publication Nos. 41475/1970, 19037/1971, 19438/1971, etc., such as p-aminophenol, benzyl-p-aminophenol, 1-phenyl-3-pyrazolidone can be used as compensating developers. The amount of the compensating developer to be added to the developer is usually about 0.1 to about 1.0 g/l.

In another approach in color photography, the color coupler can be incorporated into the developer. Of the diffusible couplers which are used by incorporation into a color developer, those couplers as described in U.S. Pat. Nos. 3,002,836, 3,542,552, etc., can be used as cyan couplers; those couplers as described in Japanese Patent Publication No. 13111/1969 can be used as magenta couplers; and those couplers as described In U.S. Pat. No. 3,510,306, etc., can be used as yellow couplers. In this case, a suitable concentration of the coupler is about 0.5 to about 5 g/l, preferably 1 to 2.5 g/l.

Color subtractive type dye images can be formed by a color negative method as described in W. T. Hanson and W. I. Kesnor, *Journal of the Society of Motion Picture and Television Engineers*, Vol. 61 (1953), pp. 667 to 701, or a color reversal method in which an imagewise exposure is effected by the use of a direct positive emulsion or a negative emulsion, a negative silver image is formed by developing in a black-white developer, an additional exposure (or another suitable fogging processing) is effected, and development is then conducted to form a subtractive color type colored dye image whereby reversal silver image is advantageously obtained.

The present invention has the advantages over the conventional methods. Some of the advantages are described below.

In the first place, a water softening agent (chelating agent) used in a color developer accelerates the decomposition of hydroxylamine when a heavy metal ion is also present. Even improved water softening agents such as 1,3-diaminopropanol tetraacetic acid and the like fail to reduce this decomposition. Thus, when the color developer is stored for a long period of time or running using the color developer is carried out for a long period of time, fogging and/or color mixing components accumulate. The method of the present invention enables these fogging and/or color mixing components to be removed completely.

Secondly, while it could be considered advantageous to incorporate an anti-fogging agent into a light-sensitive material or a processing solution so as to remove the fogging and/or color mixing components contained in the developer, this method causes a marked reduction in the gamma and sensitivity obtained. However, in accordance with the method of the present invention, only the fogging and/or color mixing components are removed from the developer and thus the above described adverse influences on the photographic properties do not occur.

Thirdly, for re-using the color developer, the removal of halogen ions, i.e., bromine ions and iodine ions, can be carried out by ion exchange, electrolysis or electrodialysis. These methods, however, cannot be used at all to remove the fogging and/or color mixing components accumulated in the developer. By repeating the regeneration processing, the amount of these components accumulated increases and finally the developer cannot be used at all. However, if the method of the present invention is used at the same time, the fogging and/or color mixing components do not accumulate, halogen ion can be removed, and thus the developer can be repeatedly used for a long period of time by supplying the components which are consumed.

The present invention will be explained in more detail by reference to the following examples. Unless otherwise indicated herein, all parts, percents, ratios and the like are by weight.

EXAMPLE 1

On a polyethylene coated paper support were coated a blue-sensitive silver bromide emulsion layer containing a yellow coupler emulsion, a green-sensitive silver chlorobromide emulsion layer containing a magenta coupler emulsion (silver chloride: 70 mole %), and a red-sensitive silver chlorobromide emulsion layer (silver chloride: 70 mole %), and a gelatin layer containing an ultraviolet light absorbing agent to produce a color paper. Each color coupler used in this color paper was prepared by dissolving each coupler in a mixture of dibutyl phthalate and tricresylphosphate, and dispersing the solution in a gelatin solution as an O/W type emulsion using sorbitan monolaurate, Turkey red oil and sodium dodecylbenzene sulfonate as dispersion emulsifying agents.

The couplers used were α-(2,4dioxo-5,5'-dimethyloxazolidinyl)-α-pivaloyl-2-chloro-5-[α-(2,4-di-t-amylphenoxy)butanamido]acetoanilide as the yellow coupler, 1-(2,4,6-trichlorophenyl)-3-[(2-chloro-5-tetradecaneamido)anilino]-2-pyrazolone-5-one as the magenta coupler, and 2-[α-(2,4-di-t-amylphenoxy)-butanamido]-4,6-dichloro-5-methylphenol as the cyan coupler.

As the ultraviolet light absorbing agent, a compound having the following general formula (a) was used.

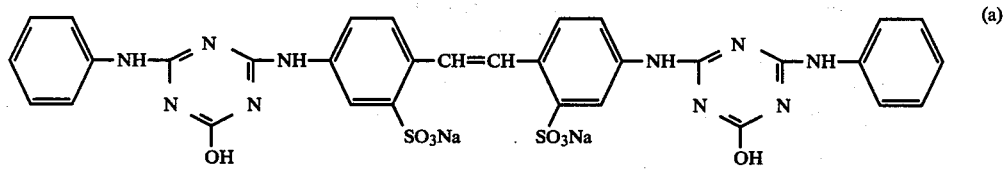

(a)

As an anti-fogging agent in the emulsion, 6-methyl-4-hydroxy-1,3,3a,7-tetraazaindene was used.

In this color paper, the amounts of the couplers and silver halide coated were as follows:

|  | Amount of Coupler (g/m$^2$) | Amount of Silver Halide (g/m$^2$) |
|---|---|---|
| Red-Sensitive Layer | 0.4 | 0.5 |
| Green-Sensitive Layer | 0.5 | 0.6 |
| Blue-Sensitive Layer | 0.4 | 0.8 |

After being exposed to light (1 second, 500 C.M.S.) by the use of an sensitometer, this photographic element was subjected to the following processings.

| Processing Steps | | |
|---|---|---|
| Color Development | 31° C. | 3 min. 30 sec. |
| Bleaching and Fixing | " | 1 min. 30 sec. |
| Water Washing | " | 2 min. |
| Stabilizing | " | 1 min. |
| Color Developer | | |
| Benzyl Alcohol | 14 | ml |
| Sodium Sulfite | 2 | g |
| Potassium Bromide | 0.5 | g |
| Sodium Carbonate (monohydrate) | 30 | g |
| 4-Amino-N-ethyl-N-($\beta$-methanesulfonamido)-m-toluidine Sesquisulfate (monohydrate) | 5 | g |
| Triethylenetetramine Hexaacetic Acid | 2 | g |
| Hydroxylamine Sulfate | 2.5 | g |
| Water to make | 1 | liter |
| Bleaching and Fixing Solution | | |
| Ammonium Thiosulfate (70% aqueous solution) | 150 | ml |
| Sodium Sulfite | 5 | g |
| Na[Fe(EDTA)] | 40 | g |
| EDTA | 4 | g |
| Water to make | 1 | liter |
| EDTA: ethylenediamine tetraacetic acid | | |
| Stabilizing Solution | | |
| Glacial Acetic Acid | 10 | ml |
| Sodium Acetate | 5 | g |
| Formaldehyde (37% aqueous solution) | 5 | ml |
| Water to make | 1 | liter |

After the color developer was prepared, it was allowed to stand at 40° C. for 5 days, and then the photographic capabilities of the color developer were measured.

Separately, the color developer was allowed to stand at a temperature of 40° C. for 5 days and then it was contacted with a 0.5 M phosphoric acid solution through a porous Teflon diaphragm (thickness: 0.40 mm; maximum pore diameter: 2.1μ; porosity: 80.5%; density: 0.43 g/cm$^3$) for 6 hours. Thereafter, the developer was removed and used in the same development processing. The results obtained are shown in Table 1 below.

Table 1

| Run No. | Developer | Fogging Density | | | Color Mixing | |
|---|---|---|---|---|---|---|
| | | R | G | B | R/G | B/G |
| 1 | Fresh | 0.11 | 0.10 | 0.12 | 0.16 | 0.26 |
| 2 | Allowed to stand | 0.25 | 0.15 | 0.16 | 0.24 | 0.30 |
| 3 | Fogging components removed | 0.11 | 0.0 | 0.12 | 0.16 | 0.26 |

Fogging Density: Red density (R), Green density (G) and Blue density (B) including the base density at the minimum density area.

Color Mixing: The values of red density at a density at the magenta colored area of 2/green density (R/G), and of blue density/green density (B/G) indicate the relative values of color mixing. Lower values indicate color images having higher color purity.

EXAMPLE 2

On a cellulose triacetate film were provided the First to Eighth Layers as described below to prepare a multilayer color sensitive material (Sample G).

First Layer: Anti-halation layer

A gelatin layer (3 mμ) containing black colloidal silver (300 mg/m$^2$).

Second Layer: Intermediate Layer

A gelatin layer (2 mμ) containing an emulsified dispersion of 2,5-di-t-octylhydroquinone.

Third Layer: Red-sensitive Emulsion Layer

Silver Iodobromide Emulsion (iodine content: 7 mole %)

Amount of silver coated: 1.6 g/m$^2$

Sensitizing Dye I: $3 \times 10^{-5}$ mole per mole of silver

Sensitizing Dye II: $3 \times 10^{-3}$ mole per mole of silver

Coupler A: 0.09 mole per mole of silver

Coupler B: 0.02 mole per mole of silver

Fourth Layer: Intermediate Layer

Same as Second Layer.

Fifth Layer: Green-sensitive Emulsion Layer

Silver Iodobromide Emulsion (iodine content: 6 mole %)

Amount of silver coated: 1.8 g/m$^2$

Sensitizing Dye I: $2.5 \times 10^{-5}$ mole per mole of silver

Sensitizing Dye II: $0.8 \times 10^{-5}$ mole per mole of silver

Coupler C: $3.5 \times 10^{-2}$ mole per mole of silver

Colored Coupler D: $1.5 \times 10^{-2}$ mole per mole of silver

Sixth Layer: Yellow Filter Layer

A gelatin layer (2 mμ) containing yellow colloidal silver and an emulsified dispersion of 2,5-di-t-octylhydroquinone.

Seventh Layer: Blue-sensitive Emulsion Layer

Silver Iodobromide Emulsion (iodine content: 6 mole %)

Amount of silver coated: 2.6 g/m$^2$

Coupler E: 0.1 mole per mole of silver

Eighth Layer: Protective Layer

A gelatin layer (2 mμ)

Materials used

Sensitizing Dye I: Anhydro-5,5'-dichloro-3,3'-disulfopropyl-9-ethyl-thiacarbocyaninehydroxide pyridinium salt Sensitizing Dye II: Anhydro-9-ethyl-3,3'-di-(3-sulfopropyl)-4,5,4',5'-dibenzothiacarbocyaninehydroxide triethylamine salt Sensitizing Dye III: Anhydro-9'-ethyl-5,5'-dichloro-3,3'-disulfopropyloxacarbocyanine sodium salt Sensitizing Dye IV: Anhydro-5,6,5',6'-tetrachloro-1,1'-diethyl-3,3'-di(sulfopropoxyethoxyethyl)imidazolocarbocyaninehydroxide sodium salt Coupler A: 1-Hydroxy-N-[γ-(2,4-di-t-amylphenoxy)propyl]-2-naphthamide Coupler B: 1-Hydroxy-4-[2-(2-hexyldecyloxycarbonyl)phenylazo]-2-[N-(1-naphthyl)]naphthamide Coupler C: 1-(2,4,6-Trichlorophenyl)-3-{3-[α-(2,4-di-t-amylphenoxy)acetamido]benzamido}-5-pyrazolone Colored Coupler D: 1-(2,4,6-Trichlorophenyl)-3-{3-[α-(2,4-di-t-amylphenoxy)acetamido]benzamido}-4-methoxyphenyl-azo-5-pyrazolone Coupler E: α-(2,4-Dioxo-5,5'-dimethyloxazolidinyl)-α-pivaloyl-2-chloro-5-[α-(2,4-di-t-amylphenoxy)butyramido]acetoanilide After being exposed to light using an actinometer (1/50 second, 25 C.M.S.), this photographic element was subjected to development processing at 80° C. according to the following steps.

| 1. Color Development | 3 min. 15 sec. |
| 2. Bleaching | 6 min. 30 sec. |
| 3. Washing | 3 min. 15 sec. |
| 4. Fixing | 6 min. 30 sec. |
| 5. Washing | 3 min. 15 sec. |
| 6. Stabilizing | 3 min. 15 sec. |

The compositions of the processing solutions used in each step was as follows:

| Color Developer | | |
|---|---|---|
| Nitrilotriacetic Acid | 1 | g |
| Sodium Sulfite | 4.0 | g |
| Sodium Carbonate | 30.0 | g |
| Potassium Bromide | 1.4 | g |
| Hydroxylamine Sulfate | 2.4 | g |
| 4-(N-Ethyl-N-β-hydroxyethylamino)-2-methylaniline Sulfate | 4.5 | g |
| Water to make | 1 | liter |
| Bleaching Solution | | |
| Ammonium Bromide | 160.0 | g |
| Aqueous Ammonia (28% aq. soln.) | 25.0 | ml |
| Sodium Ferric Ethylenediaminetetraacetate | 130 | g |
| Glacial Acetic Acid | 14 | ml |
| Water to make | 1 | liter |
| Fixing Solution | | |
| Sodium Tetrapolyphosphate | 2.0 | g |
| Sodium Sulfite | 4.0 | g |
| Ammonium Thiosulfate (70% aq. soln.) | 175.0 | ml |
| Sodium Hydrogensulfate | 4.6 | g |
| Water to make | 1 | liter |
| Stabilizing Solution | | |
| Formaldehyde (40% aq. soln.) | 8.0 | ml |
| Water to make | 1 | liter |

The photographic properties obtained are shown in Table 2 below (Sample A).

Separately, the color developer was placed in a reagent bottle and allowed to stand at 38° C. for 5 days. Thereafter, the same development processing as described above was conducted using this color developer (Sample B).

Separately, a porous Teflon tube (tube diameter: 3.6 mm; length: 3 m; thickness: 0.5 mm; maximum pore diameter: 1.7μ; porosity: 65%; density: 0.6 g/cm$^3$) was inserted in the color developer, which had been allowed to stand at 38° C. for 5 days, through which a 0.5 M phosphoric acid solution was passed at a flow rate of 5 ml/min. for 6 hours. Thereafter, the same development processing as described above was conducted using the color developer. The photographic properties obtained are shown in Table 2 below (Sample C).

Table 2

| | | (Mask plus Fog) Density | | |
|---|---|---|---|---|
| Run No. | Sample | R | G | B |
| 1 | A | 0.12 | 0.43 | 0.58 |
| 2 | B | 0.14 | 0.56 | 0.69 |
| 3 | C | 0.12 | 0.42 | 0.57 |

Sample A: Fresh Color Developer
Sample B: Color Developer allowed to stand for a certain period
Sample C: Color Developer from which the fogging components had been removed with a porous Teflon tube (method of the present invention)

EXAMPLE 3

With a light-sensitive material as described in Example 1 and with processing steps and compositions of processing solutions as described in Example 1, continuous processing was conducted in an automatic developing machine (27 m$^2$ of color paper was processed per 20 l of color developer).

In this processing, the continuous processing of the color paper increased the amounts of bromine ion and fogging components in the color developer. In order to remove the bromine ion accumulated, the regeneration of the color developer was conducted by electrolysis. As a result, an increase in fog was observed as shown in Table 3 below.

On the other hand, when a 3.6 mmφ × 1.5 m porous Teflon tube (maximum pore diameter: 3.0μ; porosity: 73%; density: 0.6 g/cm$^3$) filled with dilute sulfuric acid (98% by weight) was placed in the color developer, the fog decreased.

Electrolysis was conducted in an electrolytic bath in which an anode (stainless steel) and a cathode (carbon) were placed with a cation exchange diaphragm interposed therebetween, and the cathode cell was filled with 1.5 l of the used color developer and the anode cell was filled with 1 l of a 20 g/l sodium hydrogencarbonate solution, and by passing an electric current of 5 mA per cm$^2$ of the cation exchange diaphragm for a 30 minute period. The dilute sulfuric acid (concentration: 1 ml/l) in the tube was recycled at 100 ml/min.

As shown in Table 3, when the color paper was continuously processed beginning with a fresh developer solution, the developer solution became fatigued with the amount of the bromide increasing, and the fog and Dmax changing.

When this fatigued developer solution was subjected to electrolysis not using the porous Teflon tube, the amount of the bromide decreased while the pH of the solution increased, and the fog and Dmax also increased. Even though a correction was made as to the pH and components (0.3 g/l of sodium sulfite, 0.3 g/l of developing agent and 0.5 g/l of hydroxylamine sulfate salt were supplied), the values of the fog and Dmax remained higher than those of the fresh developer.

On the other hand, when the electrolysis was conducted by the use of the porous Teflon tube, although the pH, fog and Dmax increased, the values of the fog and Dmax were similar to those of the unelectrolized developer if the correction of the pH and components (the amounts of the components supplied were the same as above) was made.

Table 3

|  | A | B | C | D |
|---|---|---|---|---|
| pH | 10.1 | 10.0 | 10.1 | 10.1 |
| Fog |  |  |  |  |
| B | 0.12 | 0.09 | 0.27 | 0.13 |
| G | 0.10 | 0.10 | 0.15 | 0.10 |
| R | 0.11 | 0.13 | 0.27 | 0.12 |
| Dmax |  |  |  |  |
| B | 2.24 | 1.47 | 2.24 | 2.24 |
| G | 2.44 | 2.04 | 2.52 | 2.48 |
| R | 2.42 | 2.23 | 2.46 | 2.45 |

A: Fresh Developer Solution
B: Fatigued Developer Solution
C: Developer Solution subjected to electrolysis not using Teflon tube followed by adjustment of components consumed
D: Developer Solution subjected to electrolysis using Teflon tube followed by adjustment of components consumed

EXAMPLE 4

After being exposed to light using an actinometer (1 sec., 500 C.M.S.), the same color paper as described in Example 3 was processed in the same manner as in Example 3. During this processing, when the color paper was continuously processed, the amount of bromide and fogging components in the color developer increased.

In order to remove the increased bromide and fogging components, the cation exchange resin method was applied in combination with the use of a porous Teflon tube filled with dilute sulfuric acid (98% by weight). The results so obtained were compared with those of the case in which the cation exchange resin method only was applied. The testing methods employed were as follows:

A column having an inner diameter of 1 cm was filled with a cation exchange resin Amberlite IRA-410 (tradename, produced by Rohm & Haas Co.) in an amount of 40 ml in a state swollen with water. A porous Teflon tube (tube diameter: 3.6 mm; length: 50 cm) was also wound within the column filled with the Amberlite and a dilute sulfuric acid aqueous solution was circulated through the Teflon tube at a flow rate of 100 ml/min. The cation exchange resin was pre-treated with a 1 M sodium carbonate solution. Thereafter 1 l of the color developer was passed into the column at a flow rate of 3 ml/min.

As shown in Table 4, when the color paper was continuously processed beginning with fresh developer solution, the developer solution became fatigued with the amount of the bromide increasing, and the fog and Dmax changing.

When this fatigued developer solution was subjected to an ion exchange resin processing without the porous Teflon tube, the bromide was completely removed and the pH of the solution increased. The fog and Dmax also increased, and even though an adjustment of the pH and components consumed was made (0.4 g/l of sodium sulfite, 0.5 g/l of potassium bromide, 0.2 g/l of developing agent and 0.3 g/l of hydroxylamine sulfate were supplied), the fog and Dmax were somewhat different from those obtained with the fresh developer solution.

On the other hand, when the porous Teflon tube was used in combination with the ion exchange resin and the processing was conducted, the bromide was completely removed and the pH increased. Although the fog and Dmax also increased, when the adjustment of the pH and components consumed was made (the amounts of the components supplied were the same as described above), the fog and Dmax were the same as those obtained with the fresh developer solution.

Table 4

|  | A | B | C | D |
|---|---|---|---|---|
| pH | 10.1 | 10.0 | 10.2 | 10.2 |
| Fog |  |  |  |  |
| B | 0.12 | 0.09 | 0.14 | 0.12 |
| G | 0.10 | 0.10 | 0.13 | 0.10 |
| R | 0.11 | 0.13 | 0.15 | 0.11 |
| Dmax |  |  |  |  |
| B | 2.24 | 1.47 | 2.29 | 2.24 |
| G | 2.44 | 2.04 | 2.48 | 2.24 |
| R | 2.42 | 2.23 | 2.47 | 2.44 |

While the invention has been described in detail and with reference to specific embodiments thereof, it will be apparent to one skilled in the art that various changes and modifications can be made therein without departing from the spirit and scope thereof.

What is claimed is:

1. A method for removing fogging and/or color mixing components formed in a used color developer solution containing an aromatic primary amine color developing agent during development processing of an exposed silver halide color photographic material which comprises contacting the used color developer solution with an aqueous solution through a continuous fine open-cell porous diaphragm having a pore size in the range of 0.1 to 100 microns and a thickness in the range of 0.01 to 5 mm, said diaphragm being comprised of polytetrafluoroethylene or a mixture of higher than about 50% by weight polytetrafluoroethylene and with up to about 50% by weight of polyethylene, polypropylene or polyvinyl chloride to thereby transfer the fogging and/or color mixing components from the color developer solution to the aqueous solution.

2. The method according to claim 1, wherein the aqueous solution is an aqueous solution comprising water, a mixture of water and an water-soluble organic solvent or an aqueous solution containing at least one acid or a salt thereof.

3. The method according to claim 1, wherein the aqueous solution is an aqueous solution containing at least one acid or a salt thereof.

4. The method according to claim 3, wherein the acid is an inorganic acid or an organic acid.

5. The method according to claim 4, wherein the inorganic acid is hydrochloric acid, nitric acid, sulfuric acid, phosphoric acid or boric acid, and the organic acid is acetic acid, propionic acid, maleic acid, oxalic acid, malic acid or toluenesulfonic acid.

6. The method according to claim 1, wherein the color developing agent is a p-phenylenediamine derivative color developing agent.

7. The method of claim 1 wherein the average pore size is about 0.2 to 50 microns.

8. The method of claim 1 wherein the average pore size is about 0.5 to 10 microns.

9. A method for removing the fogging and/or color mixing components formed in a used color developer solution containing an aromatic primary amine color developing agent, which has been regenerated by removing the halogen ion accumulated in the color developer solution, during color development which comprises contacting the regenerated color developer solution with an aqueous solution through a continuous fine open-cell porous diaphragm having a pore size in the range of 0.1 to 100 microns and thickness in the range of 0.01 to 5 mm, said diaphragm comprised of of polytetrafluoroethylene or a mixture of higher than about 50% by weight polytetrafluoroethylene and with up to about 50% by weight of polyethylene, polypropylene or polyvinyl chloride to thereby transfer the fogging and/or color mixing components from the color developer solution to the aqueous solution.

10. The method of claim 9 wherein the average pore size is about 0.2 to 50 microns.

11. The method of claim 9 wherein the average pore size is about 0.5 to 10 microns.

* * * * *